Dec. 22, 1959     T. E. EVANS     2,918,558
THERMOSTATIC CONTROL OF ELECTRIC HEATERS
Filed Sept. 19, 1958
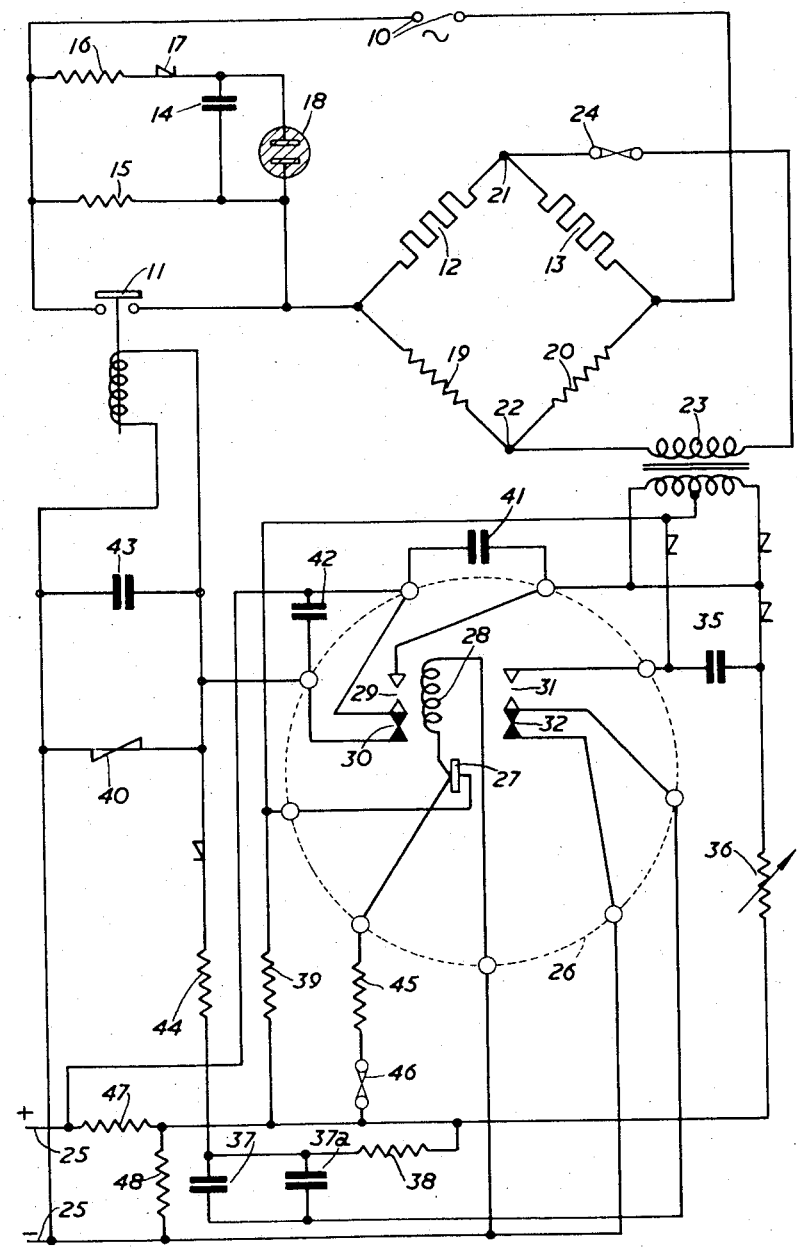
INVENTOR
THOMAS E. EVANS
BY
Watson, Cole, Grindle & Watson
ATTORNEY

United States Patent Office 2,918,558
Patented Dec. 22, 1959

2,918,558

THERMOSTATIC CONTROL OF ELECTRIC HEATERS

Thomas Edward Evans, London, England, assignor to D. Napier & Son Limited, London, England, a company of Great Britain Application September 19, 1958, Serial No. 762,176

Claims priority, application Great Britain September 20, 1957

4 Claims. (Cl. 219—20)

This invention relates to thermostatic controls for electrically heated devices of the kind which rely for their operation on changes in the electrical resistance of the heater element itself due to changes in the temperature.

It is an object of the invention to provide an improved thermostatic control which will be reliable in operation and economical in total current consumption under various service conditions.

According to the present invention a thermostatic control circuit for an electrical heating device comprises two heater elements each of which forms a substantial part of the total heating device, the two heater elements being composed at least partly of materials having different temperature coefficients of resistance, and being arranged respectively in two arms of a bridge, such that any change in the temperature of the elements will result in a potential difference or a potential balance being produced across the bridge, and means including an electrical switch for controlling the supply of heater current to the heater device in response to variations in this potential difference.

Preferably one of the two heater elements is formed of a material having substantially zero coefficient of resistance.

Moreover in a preferred arrangement the whole heating device comprises a series of heating elements arranged physically closely adjacent to one another, the two heating elements referred to being substantially identical with and arranged also physically adjacent to the other heater element or elements.

According to a preferred feature of the invention the potential difference created across the bridge in response to changes in temperature of the heating device is applied to a coil which directly or indirectly operates a relay controlling the main current supply to the heating device, and a time delay circuit comprising a capacitance and resistance is associated with the coil and selected to maintain the contact open for a predetermined minimum time interval after each interruption.

According to another preferred feature the circuit includes a capacitor arranged across the electric switch means controlling the main supply current to the heating device, such that when the contacts are opened to shut off the main supply current the greater part of the supply voltage will be applied across the capacitor and the small voltage only applied to the two heater elements, thus enabling the temperature of these heater elements to be sensed by the reduced potential difference developed across the bridge which will act to hold the switch mechanism open for a short interval of time provided that the temperature of the elements is conducive thereto.

In this case the electrical switch means preferably includes auxiliary contacts arranged to short circuit or shunt an electrical resistance in the part of the circuit responsive to the potential difference developed across the bridge, such as to compensate for the relatively low values of current and potential difference which exist at all points on the bridge when the condenser is in circuit. The condenser will also be effective in maintaining the switch means continuously open if a fault occurs in the bridge circuit.

The invention is particularly applicable to the temperature control of electrical surface heating apparatus on aircraft surfaces. In such case the main heating device is preferably of a material such as Kumanal, which has zero temperature coefficient of resistance, and one of the two heating elements in the control circuit is of the same material, the other being of a different material such as aluminium.

The invention may be performed in various different ways but one specific embodiment will now be described by way of example with reference to the accompanying drawing.

In this example the main heater circuit comprises input terminals 10 to which A.C. current is supplied from a source at 115 volts 400 c./s., a main switch 11, and two heater elements 12, 13 arranged in series. In parallel with the switch 11 there is a circuit including capacitor 14, resistances 15 and 16, rectifier 17 and a neon discharge warning lamp 18.

The main heater elements 12, 13 are formed respectively of the material sold under the registered trademark Kumanal, which has zero temperature co-efficient of resistance, and of aluminum which has a positive temperature co-efficient. The two elements have substantially the same resistance at a predetermined temperature which may be room temperature or at some point within the operating temperature range. The two elements 12, 13 are arranged in adjacent sides of a bridge network, the two remaining sides including resistances 19 and 20 each formed of nickel and having identical resistance. The two resistance points 21 and 22 of the bridge are connected to the input side of a transformer 23 through a fuse 24.

The automatic control circuit for the main switch 11 includes input terminals 25 supplied with D.C. current at 28 volts and a transistorized relay indicated generally at 26 which includes transistor 27, a control relay winding 28 and contacts 29, 30, 31 and 32. The control circuit also includes components 35 to 48, whose electrical values together with those of the components referred to above are as follows:

14   10 µf. capacitor
15   High voltage resistor
16   1 MΩ resistor
23   4:1 transformer
24   50 ma. fuse
35   50 µf. 70 v. capacitor
36   Adjustable resistor
37   140 µf., 30 v. capacitor
38   47 KΩ resistor
39   5 KΩ resistor
40   Metrosil spark suppressor resistor
41   Small spark suppressing capacitor
42   Small spark suppressing capacitor
43   50 µf., 50 v. capacitor
44   500Ω resistor
45   100Ω resistor
46   50 ma. fuse
47   200Ω resistor
48   1800Ω resistor The potential difference between the reference points 21, 22, varies proportionately with the temperature of the heater elements 12, 13 and is used to operate the relay contactor 11 which switches off the supply to the heater mats when the temperature reaches a predetermined level.

At the same time, the "heat-off" condition is maintained by the relay for a period of the order of 10–15 seconds by being self-energised from a system of charged capacitors which discharge slowly into the input circuit of the relay.

It is an important feature of the system that the magnitude of the relay signal, and therefore the operating temperature, is virtually independent of the nominal heater mat resistance. The signal is dependent only on the applied heater mat voltage and the impedance between the reference points, the latter being very large compared with the heater mat resistance.

The output from the bridge circuit is transformer coupled via 23 to the input terminals of the relay via a full wave rectifier and capacitor-resistor discharge combination 35, 36. This circuit serves to effect the changeover of relay contacts after the initial contact break has opened the contactor 11 and removed the control signal. Having made contact 3—4 and 5—6, an auxiliary capacitor-resistor discharge combination 37, 38 maintains the relay in the operated position for an additional period to give a total "heat-off" time of approximately 10 seconds, although the actual time can be increased by including an additional condenser 37a and will depend to some extent on the setting of resistor 36, which controls the temperature of cut-out.

It is also possible to obtain a considerably longer "time-off" period under poor cooling conditions by connecting the resistor 15 of high wattage across the contactor 11, thereby providing sufficient out-of-balance voltage to maintain the relay in the operated position until the heater mats have cooled considerably. When contacts 5 and 6 are closed (and the contactor is open) the transformed voltage is applied directly across the resistor 39, connected between the input terminals of the relay and is then adequate to maintain operation for a prolonged period, although in normal, or excessive cooling conditions the minimum "time-off" period will still apply thereby avoiding too rapid operation of the contactor. For most applications the normal "heat-off" period will be adequate, and the only advantage in making use of the temperature control feature is to give increased life to the contactor. A value of say 1 KΩ at resistor 15 will maintain the relay in the "heat-off" position continuously if sufficient damage to the heater mat network should occur to cause excessive out-of-balance voltage (an overriding control will probably be required to maintain uncontrolled de-icing under conditions where de-icing is essential to the safety of the aircraft. This can take the form of a star point isolating switch with three phase heater mats).

As the contactor coil is an inductive load it is necessary to employ spark suppression at the relay contacts and this is achieved with a metrosil resistor 40 across the contactor coil and a small condenser 42 across the relay contacts 6 and 7. A condenser 41 is also shown across contacts 5 and 6 to suppress the transformer output current, but it is doubtful whether this is really necessary, due to the very low value of the current.

The transformer has three principal functions:

(1) To isolate the A.C. and D.C. supplies, thereby eliminating the troubles associated with a common earth on the two systems.

(2) By saturating at a secondary voltage of 50, the condenser 35 and transistor 27 are protected against the effect of damage to the bridge circuit, resulting in the possibility of full A.C. supply voltage being applied momentarily across the transformer primary winding.

(3) By using a suitable step-up ratio, the ohmic value of resistor 15 can be sufficiently high to keep its wattage rating and physical dimensions within practicable limits. A secondary feature of the transformer is that the step-up ratio removes the necessity for the use of very low voltage miniature electrolytic capacitors which employ an extremely thin dielectric film and are therefore considered less reliable. However, with D.C. heater mats where the transformer must be dispensed with, it will be necessary to use a lower voltage condenser, but this can be protected by limiting the out-of-balance to a safe value with a Zener diode. With 28 volt heater mats the common earthing problem will not arise. With 110 volt heater mats it may be necessary to provide the energising supply for the transistor from a potentiometer connected across the 110 volt D.C. supply.

If it is required to make use of the temperature control feature as the main control, it will be necessary to use a higher step-up ratio for the transformer than that used at present (1:4). This will require a bigger transformer in order to limit the number of secondary turns per volt, i.e. a larger cross-section of iron is required. An excessive number of turns can so increase the winding impedance that the charging time of the 50 μf. condenser becomes long enough to prevent its charging sufficiently during the "heat-on" period if the latter is very short, i.e. when there is inadequate cooling. This results in chatter of the relay contacts.

It is possible to supplement the effect of the condenser 35 by delaying the opening of the contactor 11. This is done with a condenser "slug" 43 connected across the contactor coil, with a series resistor 44.

A neon warning lamp 18 is shown connected to light only if the contactor 11 remains open for longer than the normal "off" period. If it is required to provide a signal to a centralised warning relay, then a separate unit should be provided containing a miniature relay and trigger tube, the latter being triggered from a condenser "charge" circuit similar to that used to light the neon lamp. On operating, the relay will in turn signal the centralised warning relay, light a local lamp, and hold itself operated until released by a reset push button.

The invention may be applied to a three phase system in which case the bridge circuit described above would be replaced by a conventional star three phase heater circuit in which at least one of the arms of the star is formed of a zero temperature coefficient material and at least one of the arms of a material with a positive temperature coefficient. A voltage signal proportional to the temperature rise of the heater circuit can then conveniently be obtained by connecting the input to the transistorized relay between the star point of the supply and the star point of the three phase heater circuit.

What I claim as my invention and desire to secure by Letters Patent is:

1. A thermostatic control circuit for an electrical heating device comprising two heater elements each of which forms a substantial part of the total heating device, the two heater elements being composed at least partly of materials having different temperature coefficients of resistance, and being arranged respectively in two arms of a bridge, such that any change in the temperature of the elements will result in a potential difference or a potential balance being produced across the bridge, an electric switch controlling the supply of heating current to the heating device, means sensitive to changes in temperature difference produced across the bridge and operating the switch to open the switch with increases in temperature and to close the switch with reductions in temperature, and a time delay circuit comprising a capacitance and a resistance associated with the means sensitive to changes in potential difference and maintaining the switch open for a pre-determined time interval after each opening.

2. A thermostatic control circuit as claimed in claim 1 in which the means sensitive to the potential difference includes a coil operating the switch, and the circuit of the coil has the time delay circuit associated with it.

3. A thermostatic control circuit for an electrical heating device as claimed in claim 1 including a capacitance arranged across the electric switch means controlling the main supply current to the heating device, such that when the contacts are opened to shut off the main supply current the greater part of the supply voltage will be applied across the capacitor and the small voltage only applied to the two heater elements, thus enabling the temperature of these heater elements to be sensed by the reduced potential difference developed across the bridge which will act to hold the switch mechanism open for a short interval of time provided that the temperature of the elements is conducive thereto.

4. A thermostatic control circuit for an electrical heating device as claimed in claim 2 in which the electrical switch means includes auxiliary contacts arranged to short circuit or shunt an electrical resistance in the part of the circuit responsive to the potential difference developed across the bridge, such that to compensate for the relatively low values of current and potential difference which exist at all points on the bridge when the condenser is in circuit.

References Cited in the file of this patent

UNITED STATES PATENTS

| | | |
|---|---|---|
| 2,093,745 | Westell | Sept. 21, 1937 |
| 2,522,753 | Drobisch | Sept. 19, 1950 |
| 2,616,020 | Fay et al. | Oct. 28, 1952 |
| 2,838,644 | Rolfson et al. | June 10, 1958 |
| 2,858,407 | Hykes | Oct. 28, 1958 |